United States Patent [19]
Lovell

[11] 3,929,998
[45] Dec. 30, 1975

[54] NOVEL METHOD OF PROTECTING COTTON PLANTS FROM INSECT ATTACK

[75] Inventor: James Byron Lovell, Pennington, N.J.

[73] Assignee: American Cyanamid Company, Stamford, Conn.

[22] Filed: May 24, 1967

[21] Appl. No.: 640,795

[52] U.S. Cl. .............................. 424/200; 260/250 R
[51] Int. Cl.² ............................................ A01N 9/36
[58] Field of Search ............. 167/30 B, 30 H, 33 D; 424/200; 260/250

[56] References Cited
UNITED STATES PATENTS 2,938,831   5/1960   Gordon ............................. 167/33 D
3,763,160   10/1973   Schmidt et al. ................ 260/250 QP

OTHER PUBLICATIONS

So. African Application No. 66/1838, Farbenfabriken, Oct. 5, 1966.

*Primary Examiner*—V. D. Turner
*Attorney, Agent, or Firm*—H. G. Jackson

[57] ABSTRACT

The present invention relates to a novel method of protecting cotton plants from insect attack by applying to said plants or plants' environment an effective amount of O,O-dimethyl O-2-quinoxalinyl phosphorothioate or O,O-diethyl O-2-quinoxalinyl phosphorothioate.

8 Claims, No Drawings

NOVEL METHOD OF PROTECTING COTTON PLANTS FROM INSECT ATTACK

BACKGROUND OF THE INVENTION

In accordance with the teaching in recently issued South African Pat. No. 66/1838 issued to Farbenfabriken Bayer Act, certain quinoxalinyl compounds are insecticidally and acaricidally active. These compounds are structurally defined as:

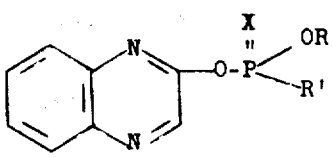

wherein R is an alkyl radical, R' is alkyl, lower alkoxy, or phenyl, and X is sulfur or oxygen. They may be prepared by reacting 2-hydroxyquinoxaline with an ester halide of the structure:

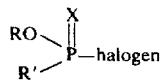

wherein R, R' and X are the same as hereinabove defined. Specifically, such compounds are said to be effective against a variety of common insects, such as aphids, bugs, grain weevils, butterfly larvae, ants, soil insects, cockroaches, houseflies, termites, spider mites, gnats, ticks and fruit flies. However, with all the rapid, recent developments in the field of agriculture, it is becoming exceedingly evident that certain crops are subject to attack by insect complexes which are exceedingly more difficult to control than are some of the more common and universally encountered insect populations. Specifically, cotton is a most important crop which is subject to attack by an extremely difficult to control insect complex. The latter complex includes: (a) the Tarnished Plant Bug (*Lygus lineolaris*), (b) the Bollworm (*Heliothis zea*), (c) the Tobacco Budworm (*Heliothis virescens*), and (d) the Boll Weevil (*Anthonomus grandis*). None of these insects is recited in the disclosure of South African Pat. No. 66/1838, supra.

Attempts to control a cotton insect complex with known insecticides, such as chlorinated hydrocarbons, or phosphates, such as methyl parathion, met with immediate success. However, subsequent generations of the insects which constitute the cotton insect complex have developed a marked resistance to chlorinated hydrocarbons and phosphate insecticides have not provided the residual activity required for completely satisfactory, extended control. Further, mixtures of the most effective of such insecticides applied to cotton plants' locus at a rate as much as three pounds per acre of toxicant fail to provide wholly satisfactory control of the cotton insect complex.

The disclosure of the aforementioned South African Pat. No. 66/1838 indicates that compounds having the structure:

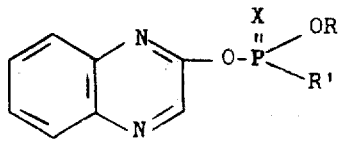

wherein X, R and R' are the same as above defined, are effective against a wide variety of common insects which adversely affect many areas of man's environment.

Surprisingly, it has been found that a cotton insect complex can be controlled and cotton plants protected over a prolonged period of time from insects' attack by applying to such plants to be protected an effective amount of either O,O-dimethyl O-2-quinoxalinyl phosphorothioate or O,O-diethyl O-2-quinoxalinyl phosphorothioate. The property of extended residual activity on cotton plants is indeed unexpected, because phosphate insecticides generally have poor residual activity and, more significantly, for the reason that residual activity of the compounds of the present invention appears to be limited to cotton plants. Notably, when said compounds are applied to crops, such as corn, alfalfa, sugar beets and beans, the protection of the crops extends generally from about 1 to 3 day and, at best, to about 14 days. However, under the same climatic conditions, but applied to cotton plants, meaningful protection is obtained for as much as 28 days when employing quinoxalinyl compounds. Their residual activity on cotton plants is thus about two to five times greater than that obtained on other crops.

The O-2-quinoxalinyl phosphorothioate compound can be applied as a finely-divided spray to plants directly as a technical material or as a concentrated, non-aqueous formulation. For instance, in low volume or ultra low volume applications, solvents which have slow evaporation rates and high flash point properties are preferred for use in preparation of formulations. Exemplary of the latter solvents are: O,O-dimethyl phosphorodithioate of diethyl mercaptosuccinate (i.e., Malathion), and aromatic solvents, such as Panasol AN2, Panasol AN5, Amsco Solvent C₇, and Socal 44L, each of which other than Malathion is characterized as having a mixed aniline point between about 30°F. and 95°F., an aromatic content of 60% to 100%, a specific gravity at 60°/60°F. between about 0.880 and 1.5, a flash point above 125°F., and an evaporation rate not exceeding about 25% in 6 hours at 25°C. and at 48% relative humidity. Malathion is preferred, since it not only meets the aforementioned requirements, but is also highly effective as an insecticide and is known for its unusually low order of mammalian toxicity.

Advantageously, the compounds employed in the process of the invention can also be prepared and used in other, more conventional formulations and may be applied to cotton plants and/or the areas in which they are grown, such as dusts, dust concentrates, granular formulations, wettable powders or emulsifiable concentrates dispersed in water or inexpensive organic solvents.

Solid formulations such as the dusts, dust concentrates, and wettable powders are prepared by admixing from about 25% to 75%, by weight, of toxicant with 75% to 25% by weight of an inert carrier, such as attapulgite, diatomaceous earth, talc or ground corn cobs, or without a suitable surfactant. The wettable powders can contain also an emulsifier and the formulation is usually dispersed in water for application.

Emulsifiable concentrates are prepared employing aromatic solvents, such as methyl butyl ketone, methyl isobutyl ketone, xylene, lower alkyl alcohols and the like and a small amount of an emulsifying agent.

The invention may be further understood by referring to the examples set forth below. These are merely illustrative and should not be taken as limitative.

EXAMPLE 1

Control of the cotton insect complex with quinoxalinyl compounds hereinabove identified is demonstrated by the following tests wherein the several insects included in the complex are employed individually and collectively as test species to determine the efficacy of O,O-dimethyl O-2-quinoxalinyl phosphorothioate and O,O-diethyl O-2-quinoxalinyl phosphorothioate against said insects. The test methods used and results obtained are provided below.

are covered and held at 80°F. and 60% R.H. After two days, mortality counts are made.

BOLL WEEVIL — ANTHONOMUS GRANDIS BOHEMAN

Test compounds are prepared as 1000 ppm in solutions in 10% acetone, 0.2% Alrodyne 315 surfactant, and 89.9% water. Ten-fold dilutions are made with 65% acetone and 35% water. The first or second true leaf of young cotton plants is dipped for 3 to 5 seconds in the test solution and placed in an exhaust hood to dry. When dry, each leaf is placed in a four-inch petri dish with a moist filter paper on the bottom. Ten adult boll weevils are removed from the stock culture and placed in the petri dish. The dishes are covered and held at 80°F. and 60% R.H. After 2 days, mortality counts are made.

The results are recorded in Table I below.

TABLE I

| Structure | Tarnished Plant Bug Lygus | | Boll Weevil | | Tobacco Budworm | |
|---|---|---|---|---|---|---|
| | ppm 100 | ppm 10 | ppm 100 | ppm 10 | ppm 1000 | ppm 100 |
| 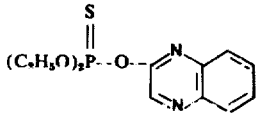 | 100 | 32 | 100 | 18 | 100 | 40 |
| 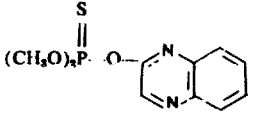 | 100 | 10 | 100 | 95 | 100 | 95 |

TOBACCO BUDWORM — HELIOTHIS VIRESCENS (FABRICIUS)

Test compounds are prepared as 1000 ppm solutions in 65% acetone and 35% water. Ten-fold dilutions are also made in 65% acetone and 35% water. Primary leaves from Sieva lima bean plants, only ¼ fully developed, are dipped for 3 to 5 seconds in the test solution and placed in an exhaust hood to dry. When dry, each leaf is placed in a one-ounce plastic medicine cup containing one dental wick saturated with water and two third instar tobacco budworms. The cup is capped and held at 80°F. and 60% R.H. After two days, mortality counts are made.

TARNISHED PLANT BUG — LYGUS LINEOLARIS (PALISOT DE BEAUVOIS)

Test compounds are prepared as 1000 ppm solutions in 10%, acetone, 0.2% Alrodyne 315 surfactant of the Geigy Company, and 89.8% water. Ten-fold dilutions are made with 65% acetone and 35% water. The primary leaves of Sieva lima bean plants are dipped for 3 to 5 seconds in the test solutions and placed in an exhaust hood to dry. When dry, each leaf is placed in a four-inch petri dish with a moist filter paper on the bottom. Ten adult Lygus bugs are aspirated from the stock culture and placed in the petri dish. The dishes

EXAMPLE 2

Residual activity of the compounds of the invention, compounds closely related to the quinoxalinyl compounds of the invention, and two commercial compounds commonly used for the protection of cotton plants is demonstrated in the following tests. From the data obtained, it is clearly demonstrated that O,O-dimethyl O-2-quinoxalinyl phosphorothioate and O,O-diethyl O-2-quinoxalinyl phosphorothioate have from about two to 28 times more residual activity on cotton than the other test compounds. The data also show that the residual activity of the quinoxalinyl compounds herein is specific to cotton plants.

Test materials are formulated as emulsifiable concentrates and applied by a moving single-nozzle sprayer at the rate of ½ pound of actual material per 86 gallons of spray per acre. Young Sieva lima bean and cotton plants are sprayed and transferred to a glasshouse, that transmits ultra-violet light, for aging. At various times after spraying, the treated leaves are removed and bioassayed with third instar southern armyworms. The leaf is placed in a four-inch petri dish with moist filter paper on the bottom and containing ten armyworms. The dishes are covered and held at 80°F. and 60% R.H. After 2 days, mortality counts are made.

TABLE II

Residual Activity of Several Compounds Applied at 1/2 lb./A. by a Single-Nozzle Sprayer to Sieva Lima Bean and Cotton Plants Percent Mortality of Southern Armyworms

| Structure | Kind of Plant | 0 | 5 | Age of Residue in Days 7 | 11 | 14 | 21 | 28 |
|---|---|---|---|---|---|---|---|---|
| $(C_2H_5O)_2\overset{S}{\underset{\|}{P}}-O-$ quinoxalinyl | Lima Bean | 100 | — | 100 | — | 100 | 20 | 53 |
|  | Cotton | 100 | — | 100 | — | 100 | 100 | 95 |
| $(C_2H_5O)_2\overset{O}{\underset{\|}{P}}-O-$ quinoxalinyl | Lima Bean | 100 | — | 40 | 0 | 5 | — | — |
|  | Cotton | 100 | — | 98 | — | 50 | 22 | 6 |
| $(CH_3O)_2\overset{S}{\underset{\|}{P}}-O-$ quinoxalinyl | Lima Bean | 100 | 8 | 5 | 0 | — | — | — |
|  | Cotton | 100 | — | 100 | — | 100 | 93 | 95 |
| $(CH_3O)_2\overset{O}{\underset{\|}{P}}-O-$ quinoxalinyl | Lima Bean | 100 | — | 5 | 0 | — | — | — |
|  | Cotton | 100 | — | 100 | — | 5 | 5 | — |
| $(CH_3O)_2\overset{S}{\underset{\|}{P}}-S-CHCOOC_2H_5$ / $CH_2COOC_2H_5$ | Lima Bean | 100 | 13 | 0 | 0 | — | — | — |
|  | Cotton | 100 | 18 | 3 | 0 | — | — | — |
| $(CH_3O)_2\overset{S}{\underset{\|}{P}}-O-C_6H_4-NO_2$ | Lima Bean | 100 | — | 3 | 0 | — | — | — |
|  | Cotton | 100 | — | 78 | 50 | 75 | 23 | — |

EXAMPLE 3

The unusually long residual effectiveness of O,O-dimethyl 0-2-quinoxalinyl phosphorothioate and O,O-diethyl 0-2-quinoxalinyl phosphorothioate for controlling insects on cotton in comparison to other agronomic crops is further demonstrated in the following tests wherein a variety of plants are sprayed with solutions of the test compounds in sufficient amounts to provide ¼ pound per acre of active material.

At intervals of about 1, 2, 3, 4, 4 ½ and 5 weeks after treatments, leaves of the sprayed plants are picked, placed in petri dishes, and third instar armyworm larvae placed on the leaves. The dishes are held in a controlled temperature and humidity room (80°F., 60% R.H.) as described in Example 2 above and mortality counts made after 2 days. Fifty percent mortality is considered as control for these tests. From the data in Table III below, it is clear that the residual activity of O,O-dimethyl O-2-quinoxalinyl phosphorothioate or O,O-diethyl O-2-quinoxalinyl phosphorothioate on cotton is far superior to that obtained on fourteen other varieties of crop.

TABLE III

| | 50% OR MORE CONTROL OF SOUTHERN ARMYWORMS FOR THE FOLLOWING NUMBER OF WEEKS | |
|---|---|---|
| Trivial Name Of Plant | O,O-dimethyl 0-2-quinoxalinyl phosphorothioate | O,O-diethyl 0-2-quinoxalinyl phosphorothioate |
| Cotton | 4½ | 5 |
| Red Clover | <1 | <1 |
| White Clover | 1 | <2 |
| Lima Bean | <1 | 2 |
| Navy Bean | <1 | <2 |
| Snap Bean | <1 | <2 |
| Soy Bean | <1 | <3 |
| Alfalfa | <1 | <1 |
| Corn | <1 | <1 |
| Sugar Beet | <1 | 1 |
| Flax | <1 | <2 |
| Cucumber | <1 | <1 |
| Broccoli | <1 | <1 |
| Cabbage | <1 | <1 |
| Cauliflower | <1 | <1 |

EXAMPLE 4

In determining the potential health hazard of any compound, the acute oral $LD_{50}$ for rats is a basic value. To evaluate the compounds of the invention, the $LD_{50}$'s in rats are determined for the compounds of the invention and compared with the $LD_{50}$'s of two commercial insecticides (i.e., Malathion and Methyl Parathion) currently employed for protection of cotton crops. Additionally, the $LD_{50}$'s for cotton boll weevil and tobacco budworm, applied topically, are determined for these compounds and are provided in table form below for use in establishing safety ratios (i.e., the $LD_{50}$ dosage to the insect in comparison to that of the mammal).

Twenty male or female albino rats of the Carworth Farms, Nelson strain, weighing approximately 90 to 120 grams are selected. These animals are fasted 24 hours before dosing.

For materials which are soluble or easily dispersed in an aqueous medium, a 20% solution or suspension is prepared in an aqueous solution of 0.2% agar and 0.1% "Tween" 80. The same series of dosages (grams or milliliters of material per kilogram of animal body weight) are used for all materials in this test. If no previous information is available on the compound or its analogs, a maximum dosage of 10 g./kg. is selected to differ by a geometric factor of two from the preceding dose, i.e., 10, 5, 2.5, 1.25 g./kg. A sufficient number of dosages is given so as to bracket a 50% response. The animals are observed for several hours after dosing and daily over a fourteenday observation period. At the end of this period, the survivors are sacrificed, weighed, and subjected to a gross autopsy. The results are tabulated and the $LD_{50}$ is calculated by the method of moving averages using the tables constructed by C. S. Weil in Biometrics, 8: (3), 249–263, (1952), as summarized in Table IV below.

EXAMPLE 5

A preliminary field test is conducted for the control of cotton bollworm with O,O-dimethyl -dimethyl O-2-quinoxalinyl phosphorothioate and 1,1-dichloro-2,2-bis-(p-chlorophenyl) ethane [TDE] and O,O-dimethyl O-p-nitrophenyl phosphorothioate [methyl parathion] as standards. The results summarized in Table V show O,O-dimethyl O-2-quinoxalinyl phosphorothioate to be better than the two standards at the same rate.

Bollworms are caged on the terminals of treated cotton and the results indicate that O,O-dimethyl O-2-quinoxalinyl phosphorothioate is more effective than either TDE or methyl parathion.

The toxicants are applied with a hand sprayer at 10 gallons per acre of total liquid at rates of one pound per acre active through 8001 flat fan nozzles with approximately 20 psi. A mixed population of Heliothis, approximately third instar, are caged on the treated terminals. Treatment is made for the comparison of O,O-dimethyl O-2-quinoxalinyl phosphorothioate and TDE. Insects are caged immediately after the spray has dried on the foliage and readings are taken after 24 hours. The results are given in the table below. A heavy rain occurred four hours after application.

TABLE V

| Treatment | Dead | Alive | Moribund |
|---|---|---|---|
| Control | 0 | 10 | 0 |
| TDE (one pound per acre) | 3 | 7 | — |
| O,O-dimethyl 0-2-quinoxalinyl phosphorothioate (one pound per acre) | 5 | 2 | 3 |

Further treatments are carried out three days later comparing methyl parathion and O,O-dimethyl O-2-quinoxalinyl phosphorothioate. Twenty worms are caged after the toxicant has dried on the foliage and

TABLE I

| Structure | Acute Oral $LD_{50}$'s mg. Per Insect Cotton Boll Weevil | Acute Oral $LD_{50}$'s mg. Per Insect Tobacco Budworm | Acute Oral $LD_{50}$'s in Rats mg. Per kg. |
|---|---|---|---|
| $(CH_3O)_2\overset{S}{P}-O-\text{(quinoxalinyl)}$ | 0.03 | 0.22 | 1870 |
| $(CH_3O)_2\overset{S}{P}-S-\underset{CH_2COOC_2H_5}{CHCOOC_2H_5}$ | 0.26 | — | 1400 |
| $(C_2H_5O)_2\overset{S}{P}-O-\text{(quinoxalinyl)}$ | 0.088 | 1.04 | 93 to 110 |
| $(CH_3O)_2\overset{S}{P}-O-\text{(phenyl)}-NO_2$ | 0.026 | 0.63 | 15 | reading taken in 48 hours. Insects are again caged at 48 hours, and reading taken 96 hours after treatment. A very light rain occurred 30 hours after treatment. The counts are given in the table below.

TABLE VI

| Treatment | Dead | | Alive | | Moribund | | Escape | |
|---|---|---|---|---|---|---|---|---|
| | 48 hrs. | 96 hrs. | 48 hrs. | 96 hrs. | 48 hrs. | 96 hrs. | 48 hrs. | 96 hrs. |
| Control | 0 | * | 9 | * | 0 | * | 1 | * |
| Methyl Parathion (one pound per acre) | 8 | 3 | 1 | 5 | 0 | 1 | 1 | 1 |
| 0,0-dimethyl 0-2-quinoxalinyl phosphorothioate (one pound per acre) | 10 | 7 | 0 | 2 | 0 | 0 | 0 | 1 |

*means no counts or caged insects.

I claim:

1. A method for protecting cotton plants from insect attack by applying to said cotton plants an insecticidally effective amount of a compound of the structure:

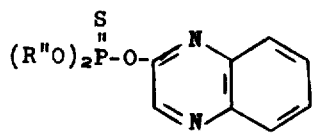

wherein R'' is methyl or ethyl.

2. A method according to claim 1 wherein the compound is O,O-dimethyl O-2-quinoxalinyl phosphorothioate.

3. A method according to claim 1 wherein the compound is O,O-diethyl O-2-quinoxalinyl phosphorothioate.

4. A method according to claim 1 wherein the insect is a member of the cotton insect complex.

5. A method according to claim 4 wherein the insect is the Tarnished Plant Bug (*Lygus lineolaris*).

6. A method according to claim 4 wherein the insect is the Bollworm (*Heliothis zea*).

7. A method according to claim 4 wherein the insect is the Tobacco Budworm (*Heliothis virescens*).

8. A method according to claim 4 wherein the insect is the Boll Weevil (*Anthonomus grandis*).